(12) United States Patent
Crabtree et al.

(10) Patent No.: US 10,204,147 B2
(45) Date of Patent: Feb. 12, 2019

(54) SYSTEM FOR CAPTURE, ANALYSIS AND STORAGE OF TIME SERIES DATA FROM SENSORS WITH HETEROGENEOUS REPORT INTERVAL PROFILES

(71) Applicant: Fractal Industries, Inc., Reston, VA (US)

(72) Inventors: Jason Crabtree, Vienna, VA (US); Andrew Sellers, Monument, CO (US)

(73) Assignee: Fractal Industries, Inc., Reston, VA (US)

( * ) Notice: Subject to any disclaimer, the term of this patent is extended or adjusted under 35 U.S.C. 154(b) by 152 days.

(21) Appl. No.: 15/091,563

(22) Filed: Apr. 5, 2016

(65) Prior Publication Data

US 2017/0286497 A1  Oct. 5, 2017

(51) Int. Cl.
*G06F 7/00*     (2006.01)
*G06F 17/30*    (2006.01)
*H04L 29/08*    (2006.01)

(52) U.S. Cl.
CPC .. *G06F 17/30551* (2013.01); *G06F 17/30333* (2013.01); *G06F 17/30516* (2013.01); *G06F 17/30592* (2013.01); *G06F 17/30864* (2013.01); *H04L 67/12* (2013.01)

(58) Field of Classification Search
CPC ......... G06F 17/30551; G06F 17/30333; G06F 17/30864; G06F 17/30592; G06F 17/30516
USPC ................................ 707/722, 737, 756, 758
See application file for complete search history.

(56) References Cited

U.S. PATENT DOCUMENTS

| | | | |
|---|---|---|---|
| 2012/0197911 A1* | 8/2012 | Banka | G06F 17/30864 707/752 |
| 2016/0006629 A1* | 1/2016 | Ianakiev | G06F 21/32 709/224 |
| 2016/0371363 A1* | 12/2016 | Muro | G01D 9/28 |
| 2017/0206464 A1* | 7/2017 | Clayton | G06N 99/005 |

* cited by examiner

*Primary Examiner* — Md I Uddin
(74) *Attorney, Agent, or Firm* — Galvin Patent Law LLC; Brian R. Galvin

(57) ABSTRACT

A system and method for the capture, storage and analysis of multidimensional time series data from sources with heterogeneous reporting profiles has been devised. Data from sets of sensors that send variable amounts of multidimensional data at irregular intervals is received by a data processing device which processes the raw data to extract the parameters of interest and held until a preset number of sensor events or amount of stream data is received. The data is then committed to a data store until time of analysis. Older data is written to archive storage. The system allows complex selection and transformation of data store data by robust query language.

4 Claims, 8 Drawing Sheets

SYSTEM FOR CAPTURE, ANALYSIS AND STORAGE OF TIME SERIES DATA FROM SENSORS WITH HETEROGENEOUS REPORT INTERVAL PROFILES

CROSS-REFERENCE TO RELATED APPLICATIONS

None.

BACKGROUND OF THE INVENTION

Field of the Invention

The present invention is in the field of receipt, storage, and analysis of large volumes of remote sensor data, specifically where the rate of sensor data delivery from the remote sensors is highly heterogeneous over time.

Discussion of the State of the Art

The ability to collect environmental information such as temperature, pressure, light levels, presence of individual chemical compounds and sound, to list a very small number of the total possibilities, continuously and in real time, even over large distances, using remote sensors has increased mankind's potential to manage and control all aspects of our ever more complex existence many fold. In addition to physical sensors, such as gravimeters, methane sensors and thermocouples, which are just a few examples of what one traditionally thinks of when sensors are discussed, there are a large number of electronic hardware and software hybrid sensors which measure computer or cluster computation speed, computer network traffic speed, pathway, destinations, bottlenecks, again, just to name a very small set of examples. Unfortunately, it is not the number or types of sensors that we can manufacture and deploy that is preventing mankind from making use of their potential and the vast amounts of information returned by them, it is instead our lack of ability to reliably retrieve and store the continuous steam of data each sensor supplies and then to manipulate that data in ways that produce meaningful, actionable results, such as repetitive events that lead to a specific climax of interest, or recognition of important trends from the raw data streams.

Quite recently, headway has been made in this problem area. Boundary has reported successful capture and short term storage of data streams generated from their time series network monitoring sensors by paring down the number of sensor parameters that they were recording, aggregating the stream entering the system such that, for example ten seconds of sensor data would be committed to their data store as a single block and, also limiting each committed block to include readings from an arbitrary and finite number of their network sensors. These data, a block measuring a defined time period by an arbitrary subpopulation of the total sensors are written as blocks to a straight key: value pair data store for a predetermined amount of time, but then must be purged to maintain low enough data storage levels to keep the system functioning. There is no provision for long-term storage of the captured data. The developers were also able to retrieve some of the raw data based on time recorded sensor ID and a keyword from the data store into which the sensor data was stored. This system, dubbed Kobayashi by the developers (Hungry Hungry Kobayashi-Dietrich Featherston from Boundary; https://vimeo.com/42902962: 2012), was a very important foundation for sensor data stream capture and simple retrieval of sensor data from a data store over a short period of time. While Kobayashi advanced the art by its ability to capture and store simplified data streams from a set of sensors, Boundary's development could not perform several tasks required for functional sensor data stream capture and analysis. These requirements derive from a list comprising: 1) The strictly time interval based commitment schedule used in Kobayashi works very well with reliable time series sensors, which means data arrives uniformly over time, but does not work satisfactorily when sensor data arrives irregularly and a large amount may be received simultaneously; 2) Kobayashi makes no provision for long term storage of the sensor data—the developers provided that only $8.64 \times 10^4$, the number of seconds in a day, be stored in the data store and then the data is purged; 3) Kobayashi has no robust query language to retrieve specific data from the data store using anything but the most rudimentary scripts; 4) There are no transformative capabilities, especially crucial when attempting to analyze large quantities of potentially noisy and complex data.

What is needed is a system and method to capture time series data to a data store from a plurality of sensors which may send data at irregular intervals, where a large amount of data may come from the array of sensors concurrently. What is further needed is a system and method for the long term archive storage of older data, possibly no longer needed for current analysis and which would lead to unacceptably high maintenance overhead in the live database, but which could be crucial in longer term trend or antecedent event analysis. Finally, what is needed is a system and methods to allow straightforward, standardized search and analysis of specific sensor data based upon complex search criteria followed by employment of transformation tools to maximize data informational potential as well as a robust set of presentation formats to maximize the informational value of the transformed data.

SUMMARY OF THE INVENTION

Accordingly, the inventor has developed a distributed system for the capture and storage of time series data from sensors with heterogeneous reporting profiles which can scale to receive periods of high data throughput. The system further includes the capacity to archive data that has surpassed a predetermined age within the live data store but which is still required. The system includes a robust SQL-like query language that not only permits users to use complex logic to specifically select desired data, but also to employ data transformation processes on selected data before data is displayed.

According to a preferred embodiment of the invention, a system for capture, analysis and storage of data time series from sensors with heterogeneous report interval profiles comprising a data stream management engine stored in a memory of and operating on a processor of a computing device, a multidimensional time series data store stored in a memory of and operating on a processor of a computing device, a data query and output engine stored in a memory of and operating on a processor of one of more computing devices is disclosed. According to the embodiment, the data stream management engine receives a plurality of sensor data, aggregates the sensor data over a predetermined amount of time, a predetermined quantity of data, or a predetermined number of events for transmission into the multidimensional time series data store, transmits a specific quantity of aggregated sensor data per each access connection predetermined to allow reliable transmission to and inclusion of the data into the multidimensional time series data store, and transparently transmits quantities of aggregated sensor data too large to be reliably transferred by one access connection using a further plurality access connections to allow capture of all aggregated sensor data by the multidimensional time series data store under conditions of heavy sensor data influx. Also according to the embodiment, the multidimensional time series data store stores aggregated sensor data in a simple key-value pair format with very little or no data transformation from how the aggregated sensor data is received, and stores data for a predetermined number of samples and then automatically purges the oldest data. Further, in some embodiments the data query and output engine is a point of interaction to set up analysis prior to sensor data collection by specifying such parameters as number of events or time units to be placed within each quantum of aggregated sensor data, the number of connection lanes between the data stream management engine and the multidimensional time series data store, number of lanes that can be combined at one time to transfer aggregated sensor data to the multidimensional data store, number of interrelated dimensions to be stored per sensor, has an SQL like query language to retrieve sensor data of interest from the multidimensional time series database in a useful format and is the point of interaction for selecting transformations performed on the retrieved multidimensional time series data store as well as specifying the format of data output.

According to another preferred embodiment of the invention, a method for capture, analysis and storage of data time series from sensors with heterogeneous report interval profiles is disclosed, the method comprising the steps of: (a) receiving raw data from remote sensors with irregular reporting interval profiles; (b) aggregating the sensor data based upon the number of sensors included in the analysis and a predetermined time interval or a predetermined number of events; (c) transferring aggregated sensor data to a multidimensional time series data store using one to a predetermined plurality of communication lines dependent upon the number of raw sensors reporting data; (d) storing un-transformed aggregated sensor data in a key-value pair data store for a predetermined period of time, removing the stored aggregated sensor data as it times out; (e) retrieving aggregated sensor data of interest to an ongoing analysis from the multidimensional data store using an SQL-like query language; and (f) transforming then formatting that data as best suited to its role in the ongoing analysis.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
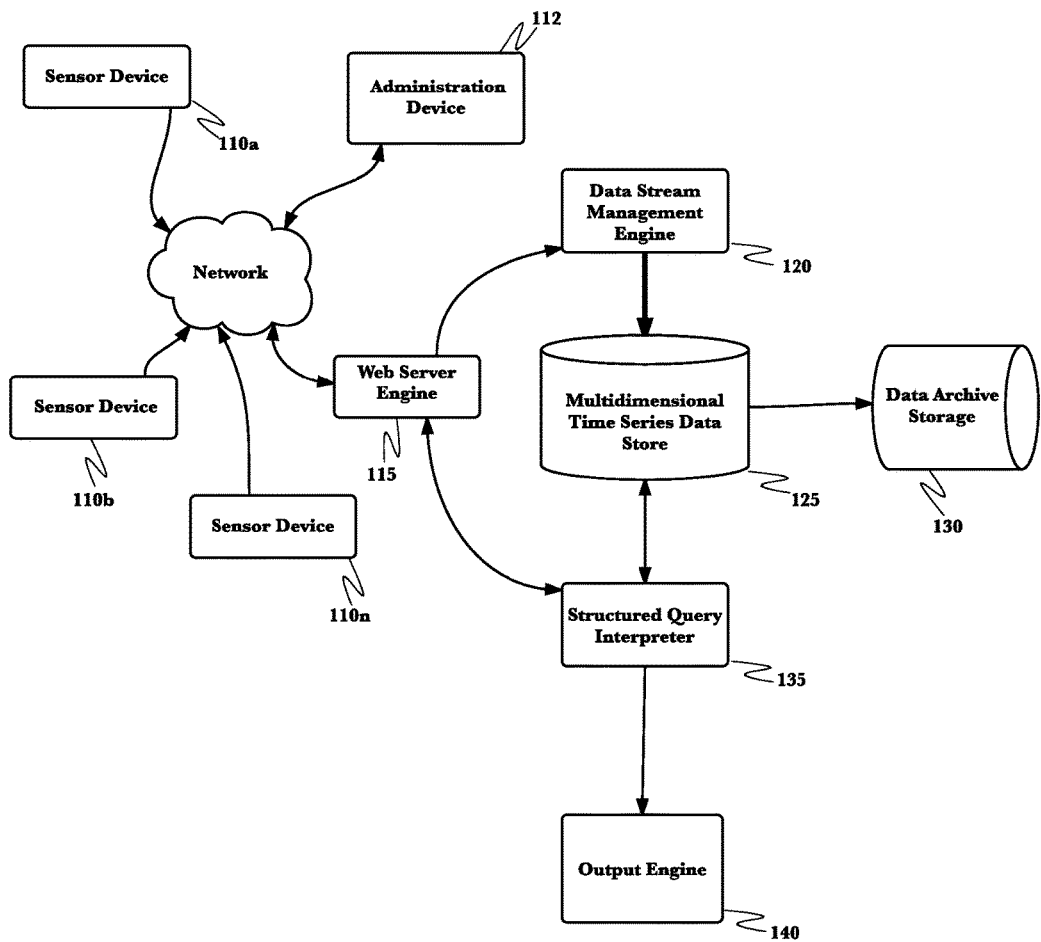
FIG. 1 is a diagram of an exemplary architecture of a system for the capture and storage of time series data from sensors with heterogeneous reporting profiles according to an embodiment of the invention.

The inventor has conceived, and reduced to practice, a system and method for capture, analysis, and storage of time series data from sensors with heterogeneous report interval profiles.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

As used herein, a "swimlane" is a communication channel between a time series sensor data reception and apportioning device and a data store meant to hold the apportioned data time series sensor data. A swimlane is able to move a specific, finite amount of data between the two devices. For example a single swimlane might reliably carry and have incorporated into the data store, the data equivalent of 5 seconds worth of data from 10 sensors in 5 seconds, this being its capacity. Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane can transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

Conceptual Architecture

FIG. 1 is a diagram of an exemplary architecture of a system for the capture and storage of time series data from sensors with heterogeneous reporting profiles according to an embodiment of the invention 100. In this embodiment, a plurality of sensor devices 110a-n stream data to a collection device, in this case a web server acting as a network gateway 115. These sensors 110a-n can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 120, where it is aggregated and organized for storage in a specific type of data store 125 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and the to store real time data from multiple sensors would invariably lead to significant data loss. In this circumstance, the data stream management engine 120 would hold incoming data in memory, keeping only the parameters, or "dimensions" from within the larger sensor stream that are pre-decided by the administrator of the study as important and instructions to store them transmitted from the administration device 112. The data stream management engine 120 would then aggregate the data from multiple individual sensors and apportion that data at a predetermined interval, for example, every 10 seconds, using the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 112, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 112.

Figure 3:
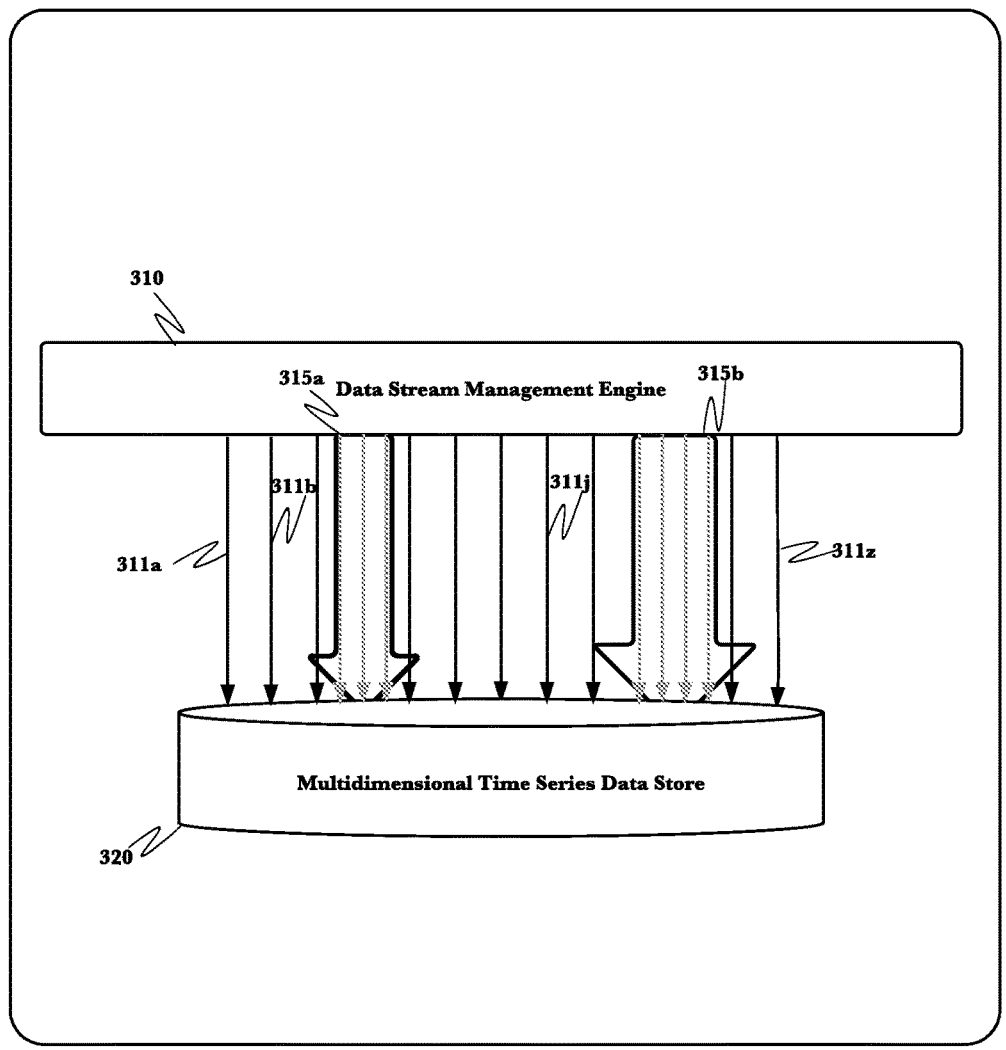
FIG. 3 is a process flow diagram of a method for the use of meta access channels to transparently accommodate levels of data streaming which would overload a single access channel according to an embodiment of the invention.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 112, combine the data movement capacity of two or more swimlanes, the combined bandwidth dubbed a metaswimlane, transparently to the committing process, to accommodate the influx of data in need of commitment. A diagrammatic representation of the formation of metaswimlanes 315a, 315b from individual swimlanes 311a-z is shown in FIG. 3. All sensor data, regardless of delivery circumstances are stored in a multidimensional time series data store 125 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 130. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 112 and acted upon within the database by the structured query interpreter 135. Below is a highly simplified example statement to illustrate the method by which a very small number of options that are available using the structured query interpreter 135 might be accessed.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 2:
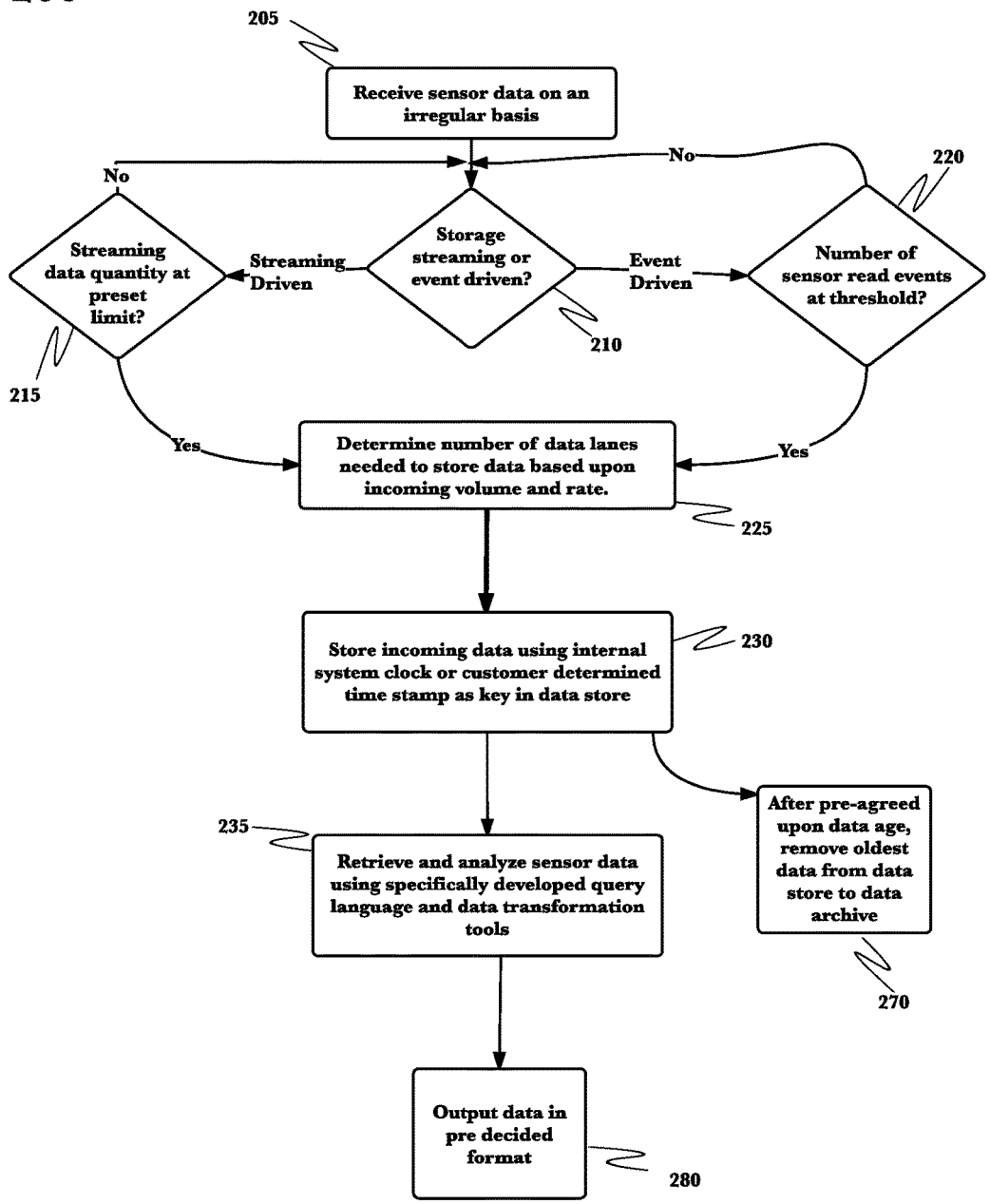
FIG. 2 is a method flow diagram showing an exemplary set of step used in the capture and storage of time series data from sensors with heterogeneous reporting profiles according to an embodiment of the invention.

FIG. 2 is a method flow diagram showing an exemplary method 200 used in the capture and storage of time series data from sensors with heterogeneous reporting profiles according to an embodiment of the invention. In the first step of the method 205, data is received from a set of sensors connected to a capture and analysis device as in the embodiment depicted in FIG. 1. The sensor data received might be captured and stored under two main paradigms. One is that the sensor data arrives at a defined, reliable periodicity, which may be continuously, but the amount of data per unit time is reliably homogeneous and thus the capture and storage of the sensor data is easy to perform using simple time based models. This paradigm and its resolution is prior art and is not depicted. The second paradigm occurs when the sensors being monitored send data at irregular intervals and the amount of data received by the capture and analysis device can vary greatly overtime. This heterogeneous sensor data behavior demands different processing strategies than does the homogeneous counterpart. Sensor data capture devices that store sensor data at strictly regular time intervals fair badly as the amounts of data per storage cycle can vary greatly. Two strategies that have been found to work reliably in conditions of heterogeneous data influx are event driven and stream capture. The event driven strategy holds data in the memory of a data stream management engine 120 until a preset number of data events have occurred 210-220. Data is processed by selecting the parameters, or dimensions within it that are of importance to the administrator and then stored to the data store when a predetermined threshold of events is reached 220, 230. The streaming strategy uses the quantity of data accumulated in a data stream management engine 120 as the trigger 210-215 to commit the processed sensor data to storage 215-230. According to the embodiment, an administrator may preselect either event driven or stream driven commitment, as well as many other parameters pertaining to analysis of sensor data using the administration device 112.

Under conditions of heterogeneous sensor data transmission, there will be times when the rate at which the incoming data to be committed to data store, exceeds the transmission capacity of a single data swimlane 225. This possibility is accounted for by allowing the system to transparently assign more than one real swimlane to a single data transfer. For example if a single real swimlane can transfer 5 sensors worth of data per unit time and the data from 8 sensors must be committed in that unit time, the system can, if pre-set by the administrator, a metaswimlane, illustrated in FIG. 3 can use real 2 swimlanes, one to transfer 5 sensors worth of data to the data store and the other to transfer three sensors' worth of data to the data store, maintaining the appearance that a single swimlane is in use to the committing process.

All sensor data, regardless of delivery circumstances are stored in a multidimensional time series data store 230 which is designed for very low overhead, rapid data storage and minimal maintenance needs to sap resources. The embodiment uses a key-value pair data store examples of which are Riak, Redis and Berkeley DB for their low overhead and speed although the invention is not specifically tied to a single data store type that is known in the art should another with better response to feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 10^4$ records, equivalent to 24 hours of 1 second interval sensor readings or 60 days of 1 minute interval readings. In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 270. This archival storage as shown provided by data archive 130 might be locally provided by the user, might be cloud based such as that offered by Amazon Web Services or Google or could be any other available very large capacity storage method known to those skilled in the art. Sensor data can be specifically retrieved, using complex query logic 235 and transformed using such tools as mean reading of all query included sensors, variance of all readings of all sensors queried, standard deviation of queried sensors and more complex types such as standard linear interpolation, Kalman filtering and smoothing, may be applied. Data can then be represented in various formats such as, but not limited to text, JSON, KML, GEOJSON and TOPOJSON by the system depending on the ultimate use of the resultant information 280.

FIG. 3 is a process flow diagram of a method for the use of metaswimlanes to transparently accommodate levels of data streaming which would overload a single swimlane according to an embodiment of the invention. As previously described in the text for FIG. 1 and FIG. 2, when attempting to commit data from sets of real time sensors that send data at irregular time intervals and probably heterogeneous amounts per unit time, it is likely that situations will arise when the instantaneous influx of data to be transferred from a data stream management engine 310, also shown in context to an entire embodiment of the invention as 120 in system 100, to a multidimensional time series data store 320 shown in context as 125 in a system embodiment of the invention 100, will exceed the instantaneous data capacity of a single data channel, or swimlane 311a between the data stream management engine 310 and the multidimensional time series data store 320. Under those conditions, if a remedy could not be brought to bare, important, possibly crucial data could be lost. The remedy taken and shown in this embodiment is the ability of the system to, when configured, combine the transfer and commitment bandwidth of two or more real swimlanes 315a, 315b in a way that is transparent to the committing process. This means that the invention handles the physical transfer pathway as well as the logical details such as tracking the multiple key-value pairs, process identifications and any application specific bookkeeping involved as overhead to the process and then creating a data structure to have the data records act as a single entity in subsequent data manipulations.

Figure 4:
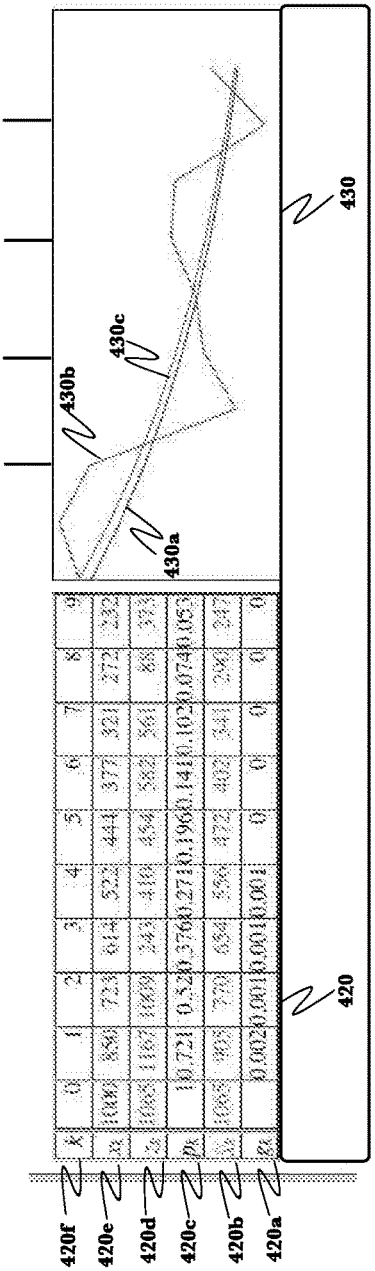
FIG. 4 is a simplified example of the use a Kalman filter to extract and smooth estimated system state from noisy sensor data according to an embodiment of the invention.

FIG. 4 is a simplified example of the use a Kalman filter to extract and smooth estimated system state from noisy sensor data according to an embodiment of the invention. Because of its ability to extract reliably accurate, interpretable data in cases of noisy input data, heavy use is made of Kalman filters in data transformation functions of various embodiments of the invention. It is useful to provide a simple demonstration of how such filters might work in one or more embodiments of the invention. For exemplary purposes, let us imagine that miners in a deep underground mine dig into a large underground repository of carbon dioxide, which rushes into the lowest level of the mine displacing a significant amount of the atmosphere in the mine's lowest level; assume the $CO_2$ level there stabilizes at 50%. The mine company decides to use a combination of lithium hydroxide canisters and the mine shaft's ventilation to handle the problem. A system 100 according to the invention, may be connected to an array of $CO_2$ sensors to monitor the progress of the cleanup. In the example, 50% $CO_2$ registers as 1000 on the $CO_2$ sensors and as a whole the manufacturer states the array will have a noise level of 400. It is believed that the efforts can remove 15.0% of the present $CO_2$ per hour.

Looking at the Kalman filter equations listed in 410:
a is equal to the percent of CO2 that will be left, compared to the percent in the previous measurement period or 100%−15%=85%. So a=0.85.
$\hat{x}_k$ represents an estimated current result
$\hat{x}_{k-1}$ represents the previous estimated result
r is the publish noise level of the sensor or sensor array
$z_k$ represents the current observed result
$p_k$ is the prediction error between the last previous expected result and the last previous observed result.
Lastly, gk is the factor by which the difference between the last expected result and the current observed result that when added to the last expected result will produce the current expected result.

For each data point plotted in analysis of the sensor data the expected results are calculated using the top equation in 410 and the error prediction using the second equation. The lower equations are used to update the numbers used to calculate the next set of estimated values $\hat{x}_k$. Looking at 420, 420e shows calculated $CO_2$ values ($x_k$) determined by multiplying the previous $CO_2$ expected value by the expected reduction of 15% (a) 430a. 420d are the actual values reported by the $CO_2$ sensors 430b at the displayed time points 420f. The Kalman estimated values, starting at the initial reported $CO_2$ sensor value is shown 420b. When graphed, this set of estimated values is depicted in line 430c. The effect of Kalman filter smoothing can be seen by comparing the graphed actual $CO_2$ sensor readings 430b to the graphed Kalman filter data 430c. As the embodiment stores data long term, users of it can also take advantage of a variant of the Kalman filter known as Kalman soothing where data from an another time period is used to better visualize current data. An example would be to use correction data from hours four through eight of the $CO_2$ analysis to smooth hours 12 thorough 14, not depicted.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
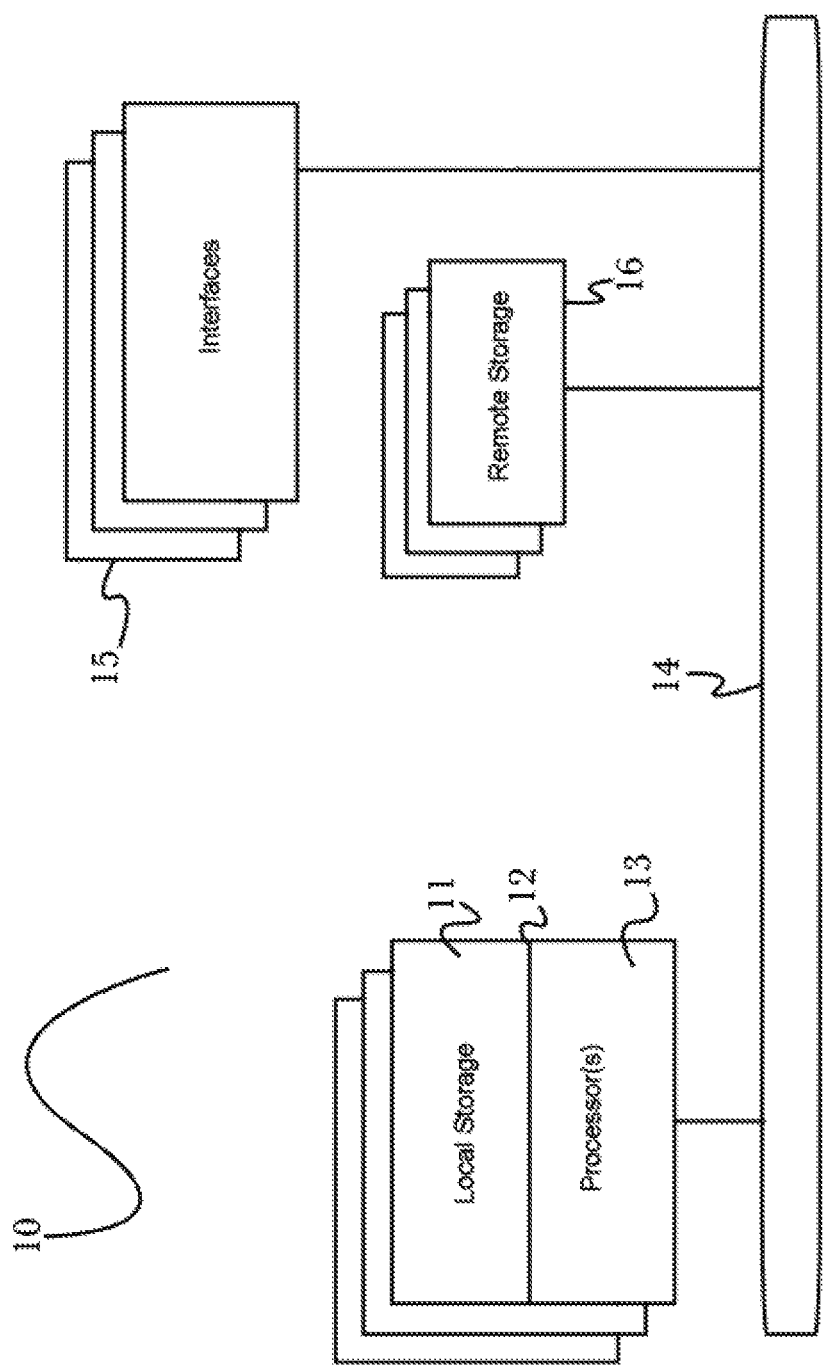
FIG. 5 is a block diagram illustrating an exemplary hardware architecture of a computing device used in various embodiments of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10.

In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
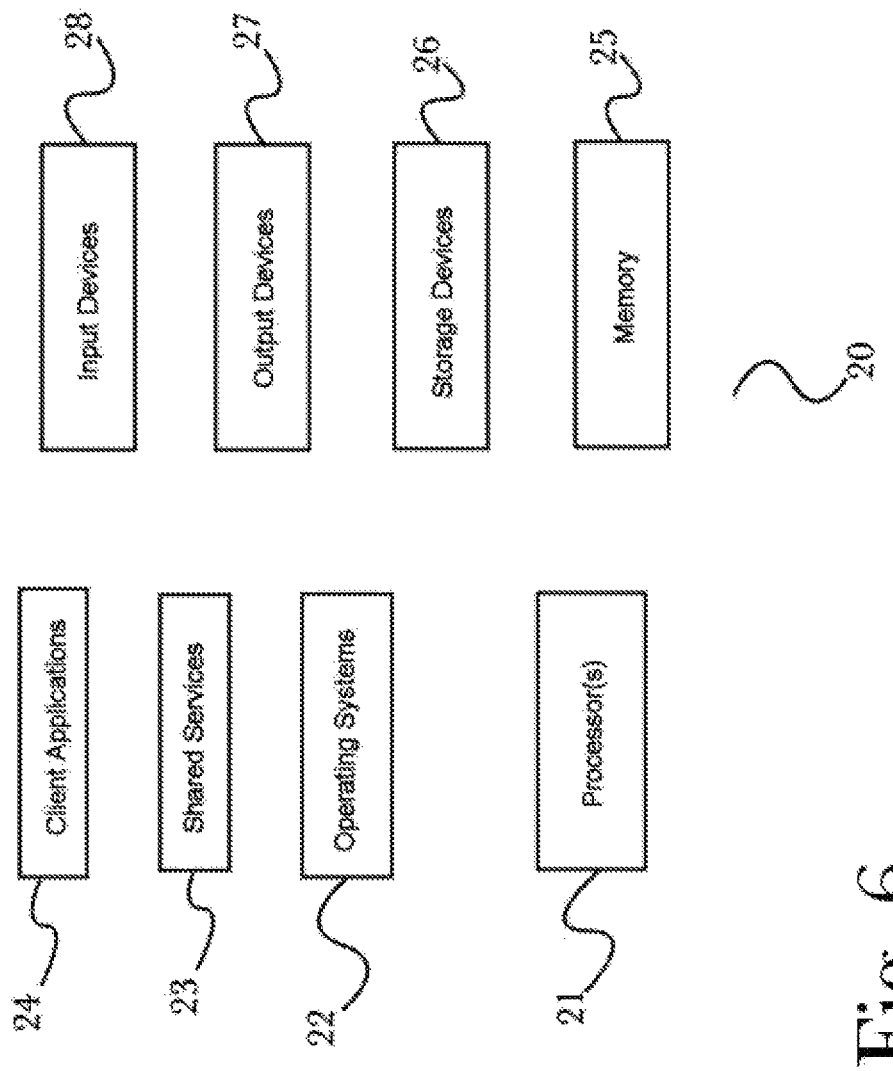
FIG. 6 is a block diagram illustrating an exemplary logical architecture for a client device, according to various embodiments of the invention.

In some embodiments, systems according to the present invention may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 7:
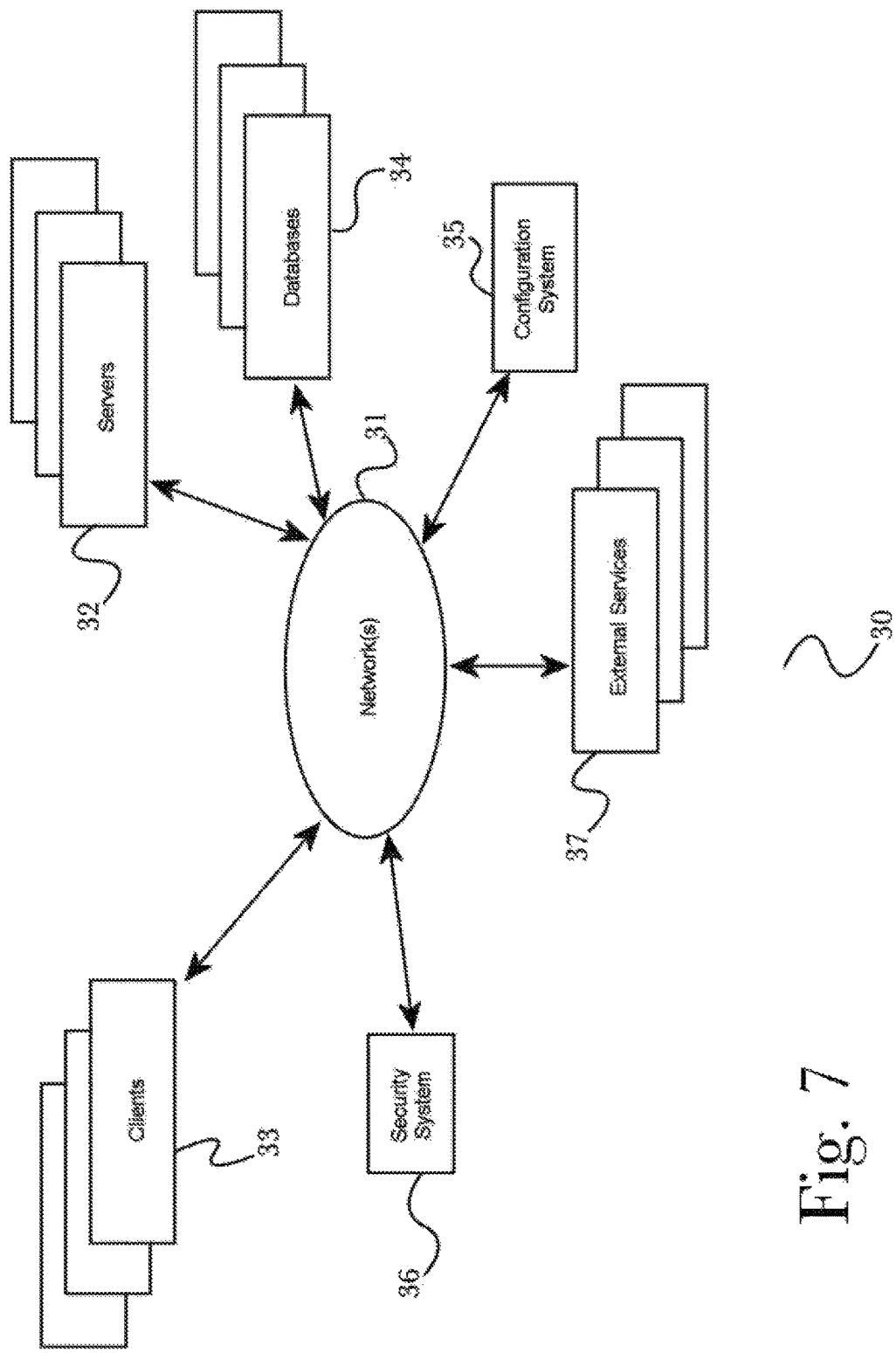
FIG. 7 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 7, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 8:
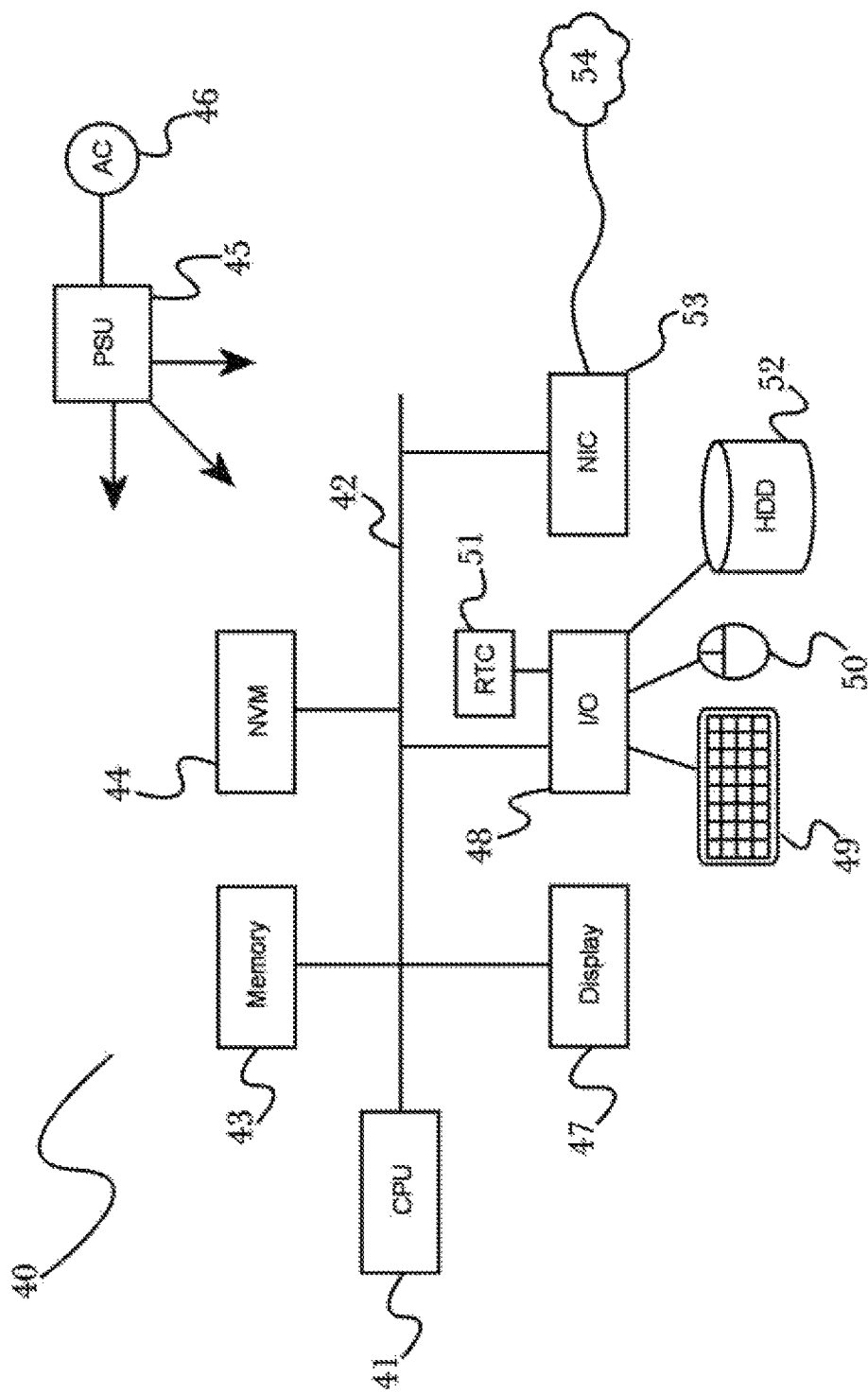
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client The skilled person will be aware of a range of possible modifications of the various embodiments described above. Accordingly, the present invention is defined by the claims and their equivalents.

What is claimed is:

1. A system for capture, analysis and storage of data time series from sensors with heterogeneous report interval profiles comprising:
   a data stream management engine stored in a memory of and operating on a processor of a computing device;
   a multidimensional time series data store stored in a memory of and operating on a processor of a computing device;
   a data query and output engine stored in a memory of and operating on a processor of one or more computing devices;
   wherein, the data stream management engine:
   (a) receives a plurality of raw sensor data on an irregular basis wherein the sensor includes heterogeneous report interval profiles;
   (b) aggregates the sensor data over a predetermined amount of time, a predetermined quantity of data and a predetermined number of events for transmission into the multidimensional time series data store;
   (c) transmits a specific quantity of aggregated sensor data per each access connection predetermined to allow secure transmission to and inclusion of the data into the multidimensional time series data store;
   (d) transparently transmits quantities of aggregated sensor data to the multidimensional time series data store securely by one access connection using a further plurality access connections to allow capture of all aggregated sensor data by the multidimensional time series data store under conditions of heavy sensor data influx and determine number of data lanes needed to store data based upon incoming volume and rate; and
   wherein the multidimensional time series data store:
   (e) stores aggregated sensor data in a simple key-value pair format using internal system clock or customer determined time stamp as key in the data store;
   (f) stores data for a predetermined number of samples then automatically purges the oldest data; and
   wherein the data query and output engine:
   (g) is a point of interaction to set up analysis prior to sensor data collection by specifying parameters as number of events or time units to be placed within each quantum of aggregated sensor data, the number of connection lanes between the data stream management engine and the multidimensional time series data store, number of lanes that can be combined at one time to transfer aggregated sensor data to the multidimensional data store, number of interrelated dimensions to be store per sensor;
   (h) has an SQL query language to retrieve sensor data of interest from the multidimensional time series database in a specifying format;

(i) is the point of interaction for selection of transformations performed on the retrieved multidimensional time series data store as well as specifying the format of data output.

2. The system of claim 1 wherein, a long term data store stored in a memory of and operating on a processor of a computing device receives older time series data that has timed on the multidimensional time series data store and stores that data until needed or released.

3. A method for capture, analysis and storage of data time series from sensors with heterogeneous report interval profiles, the method comprising the steps of:
(a) receiving plurality of raw data from remote sensors with irregular heterogeneous reporting interval profiles;
(b) aggregating the sensor data based upon the number of sensors included in the analysis and a predetermined time interval and a predetermined number of events for transmission into the multidimensional time series data store;
(c) transferring the aggregated sensor data to the multidimensional time series data store using one to a predetermined plurality of communication lines dependent upon the number of sensors reporting data and transparently transmits quantities of aggregated sensor data to the multidimensional time series data store securely by one access connection using a further plurality access connections to allow capture of all aggregated sensor data by the multidimensional time series data store under conditions of heavy sensor data influx and determine number of data lanes needed to store data based upon incoming volume and rate;
(d) storing un transformed aggregated sensor data in a key-value pair data store for a predetermined period of time, removing the stored aggregated sensor data as it times out;
(e) retrieving aggregated sensor data of interest to an ongoing analysis from the multidimensional data store using an SQL query language;
(f) transforming retrieved multidimensional time series data then formatting that data in a specifying format;
(g) analyzing collected sensor data by specifying parameters as number of events or time units to be placed within each quantum of aggregated sensor data, the number of connection lanes between the data stream management engine and the multidimensional time series data store, number of lanes that can be combined at one time to transfer aggregated sensor data to the multidimensional data store, number of interrelated dimensions to be store per sensor.

4. The method of claim 3 wherein, aggregated sensor data that has aged to the point of being removed from the multidimensional time series data store is stored on an external storage server until needed or released.

* * * * *